United States Patent [19]

Francisco

[11] Patent Number: 5,278,003

[45] Date of Patent: Jan. 11, 1994

[54] COVER ASSEMBLY FOR MAINTENANCE-FREE LEAD-ACID BATTERIES

[75] Inventor: Airton A. Francisco, S. Paulo, Brazil

[73] Assignee: Microbat Ltda., S. Paulo, Brazil

[21] Appl. No.: 86,735

[22] Filed: Jul. 2, 1993

Related U.S. Application Data

[63] Continuation-in-part of Ser. No. 744,531, Aug. 13, 1991, abandoned.

[30] Foreign Application Priority Data

Nov. 16, 1992 [BR] Brazil .................................. 9005905

[51] Int. Cl.$^5$ .............................................. H01M 2/02
[52] U.S. Cl. .................................... 429/175; 429/177; 429/187
[58] Field of Search ..................... 429/175, 177, 187

[56] References Cited

U.S. PATENT DOCUMENTS

3,647,556  3/1972  Cox ........................................ 429/82
4,444,853  4/1984  Halsall et al. ......................... 429/54
4,693,949  9/1987  Kellett et al. ........................ 429/178

Primary Examiner—Prince Willis, Jr.
Assistant Examiner—M. Nuzzolillo
Attorney, Agent, or Firm—Notaro & Michalos

[57] ABSTRACT

A cover assembly for a maintenance-free lead-acid battery consists of various fitted sections. A primary cover is secured to a battery and provides for gases to escape from the battery as well as electrolyte to flow to the battery. A gas condensation chamber is secured to the primary cover and contains escaped gas received from the battery. A handle is fitted into the primary cover and is inserted through a secondary cover which is fitted over the primary cover, the gas condensation chamber and the handle. Two synthetic or ceramic microporous disks are fitted into the gas condensation chamber in order to avoid flame or spark penetration into the battery. The battery is opened by cutting into a U-slot provided on the secondary cover for access to the cells of the battery. A lever provided on the secondary cover allows the handle to lift through the secondary cover when the lever is depressed.

5 Claims, 7 Drawing Sheets

COVER ASSEMBLY FOR MAINTENANCE-FREE LEAD-ACID BATTERIES

CROSS-REFERENCE TO RELATED APPLICATIONS

This is a continuation-in-part application of Ser. No. 07/744,531, filed Aug. 13, 1991, and now abandoned.

FIELD AND BACKGROUND OF THE INVENTION

The present invention relates in general to battery covers, and in particular to a new and useful cover assembly for a maintenance-free lead-acid battery.

Year after year there are many improvements in lead-acid battery systems, especially in the "maintenance-free" characteristics for lead-acid batteries. At present, water loss in a lead-acid automotive battery is very low due to the use of calcium grids or hybrid systems. Water addition is less often required than for conventional batteries.

Because of the low water characteristics found in maintenance-free lead-acid batteries it is now possible to develop a different type of cover assembly that results in an improved design and easier handling capability.

The present invention is believed to be patentably distinct over the prior art as follows.

Jergl et al. U.S. Pat. No. 4,891,270 discloses a pressure release system for electric storage batteries comprising a one-piece assembly i.e. a primary cover having cover pieces and fill caps. A handle is provided at the top surface of the cover.

International Application WO 86/04186 discloses a storage battery cover for containing electrolyte in at least two cells through channels defined by walls which protrude perpendicularly to the top of the cover.

Cox U.S. Pat. No. 3,647,556 discloses a one-piece storage battery cover having a plurality of hinged lids for sealing in electrolyte in electrolyte filler wells. Vent wells permit gases to escape from the battery. This ventilation system occurs in each individual cell.

Stocchiero U.S. Pat. No. 5,053,296 discloses a battery lid of one-piece design having two openings for the passage of the poles of a battery. A central opening is provided for filling electrolyte. This cover is designed to absorb the deformation of the terminals or poles.

Stocchiero U.S. Pat. No. 4,857,422 discloses a battery lid having an H-shaped protrusion on the top surface of the cover for stacking purposes with similar covered batteries. This configuration also serves as a fixed handle system due to the transverse piece.

Kump et al. U.S. Pat. No. 4,851,305 discloses a cover and battery wherein a ventilation system is provided with masked lids positioned on the cover, which can be removed for replacement of the electrolyte. The ventilation system is provided with a single exit for the gases, mounted on the central portion of the cover provided with a system intended to avoid the admission of flames.

Hardigg et al. U.S. Pat. No. 4,276,360 discloses a cover for industrial battery receptacles such as battery jars. The cover is of one-piece design having vent hole and holes for terminal posts of the battery.

None of the references, nor combinations of these references, disclose the combination of unique features of the present invention in any obvious way.

SUMMARY OF THE INVENTION

The present invention comprises an inviolable cover assembly for maintenance-free lead-acid batteries having four separate sections.

A primary cover is secured to a battery container and provides for gas to escape from the battery and electrolyte to flow back to the battery. During charging when gas is present, some of the acid leaves the cell and condenses in a condensation chamber. An important feature of the invention is the facility to make the acid return to the cell. A housing defining a gas condensation chamber is secured to the primary cover for receiving escaped gas from the battery. A secondary cover is secured over the primary cover. A handle is secured to the primary cover and extends through the secondary cover. All of these components can be manufactured in polymeric material.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
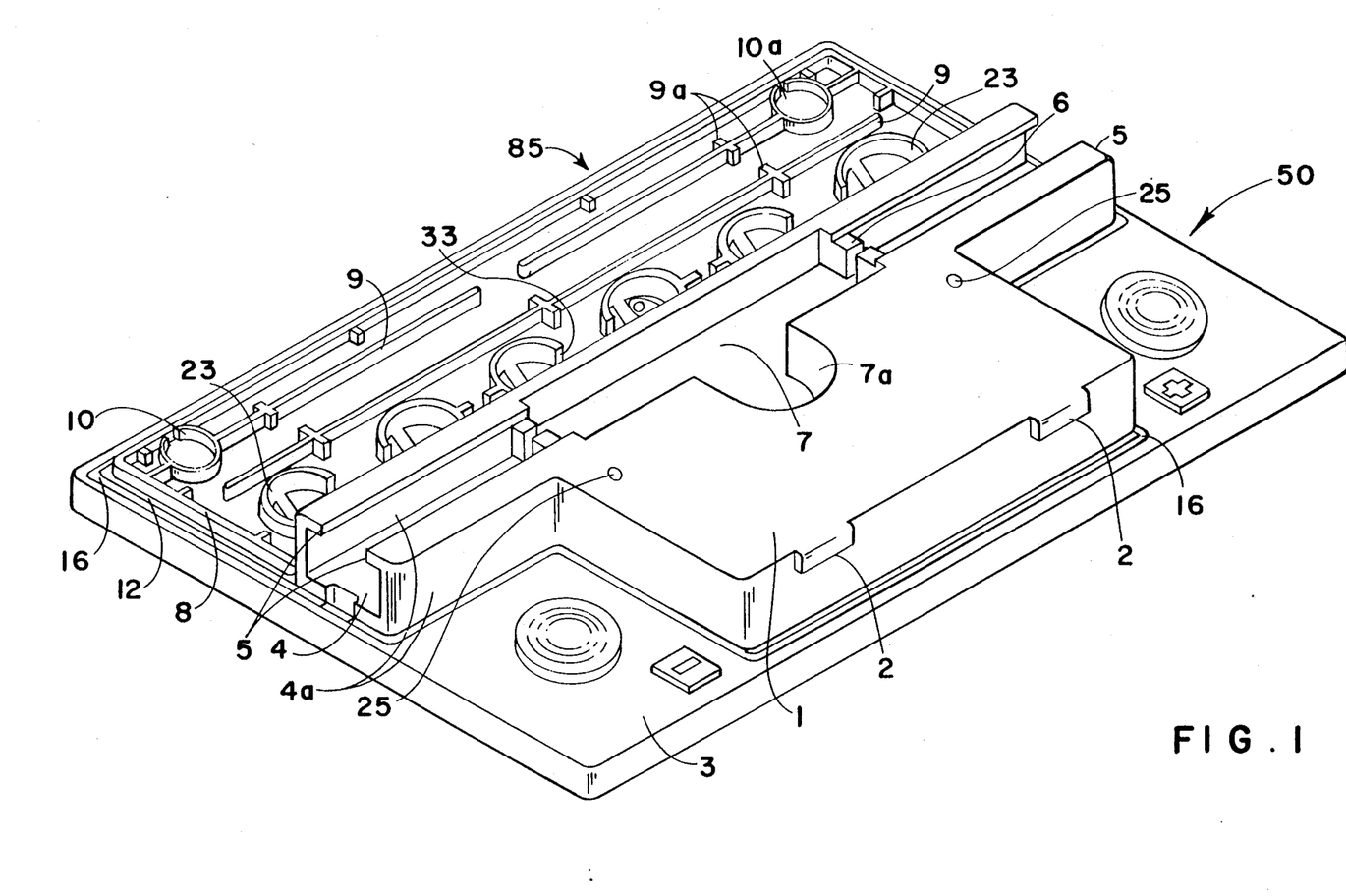
FIG. 1 is a perspective view of a primary cover of the present invention.
Figure 3:
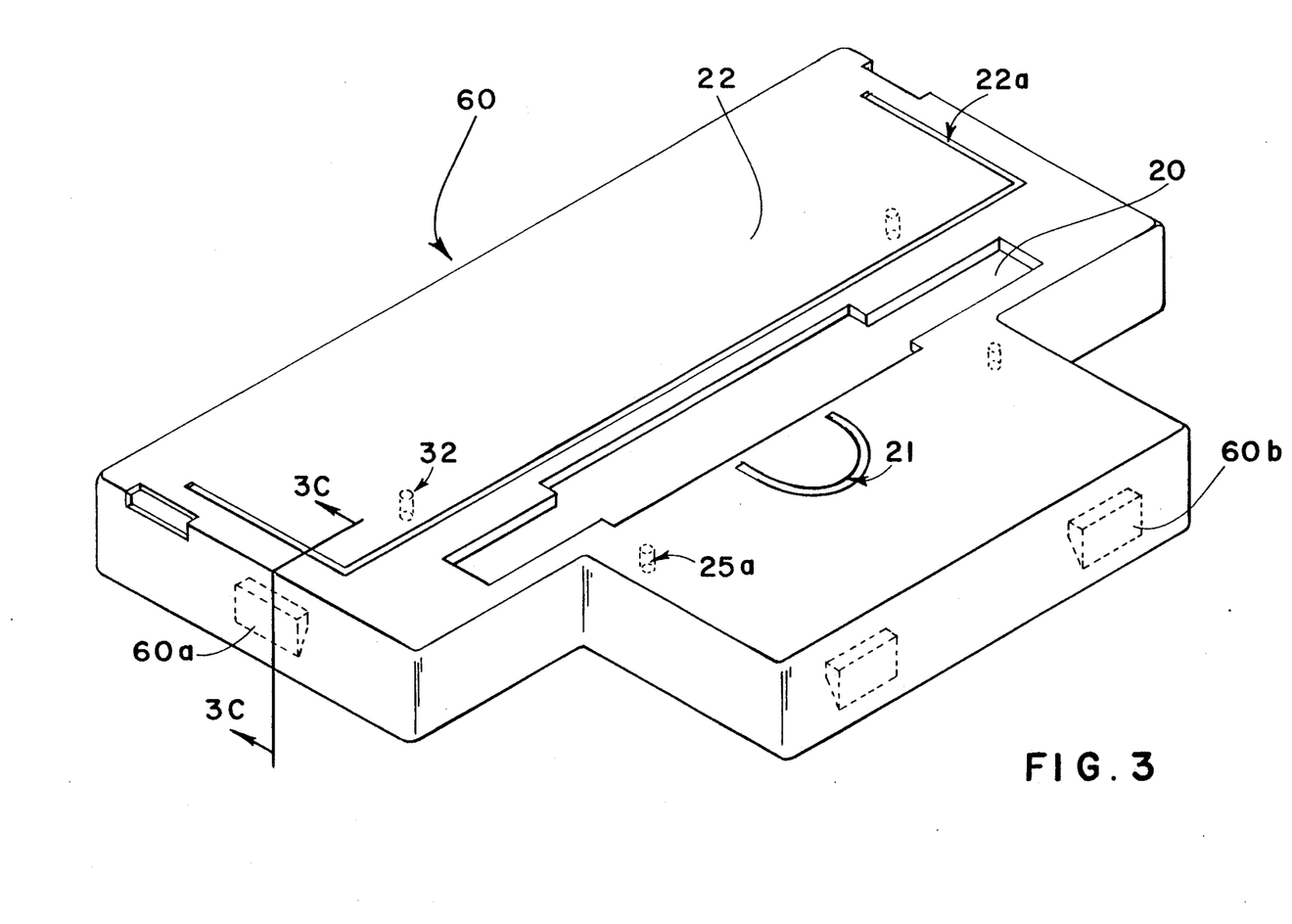
FIG. 3 is a perspective view of a secondary cover of the present invention.

Referring to the drawings in particular, where the same reference numerals are used throughout, to designate the same or functionally similar parts, the invention embodied in FIG. 1 comprises a primary cover generally designated 50 having an upper flat portion or raised platform 1 with rims or tabs 2 for securing a secondary cover 60 shown in FIG. 3. Holes 25 are also provided on the platform 1 for assisting in the securing of the secondary cover 60 which has interior pins 25a that engage the holes 25.

The central platform 1 is carrie don a lower portion 3. A longitudinal channel 4 is provided on the primary cover near the platform 1. Upper flanges 5 lie in the same plane with the central flat platform 1 and extend parallel over the length of the ends of longitudinal channel 4, transversely to the extent of platform 1. Flanges 5 are at the top of a pair of spaced side walls 4a that define the channel 4.

Two pairs of stopper 6 are provided beneath the flanges 5 and within the longitudinal channel 4. A central T-shaped gap 7 is provided within the central flat surface of platform 1 and the longitudinal channel 4 forming a T-shaped configuration for the accommodation of a handle 70 shown in FIG. 4. Gap 7 has a semi-circular recess 7a in platform 1 that forms the leg of the T-shape. Flanges 5 do not extend into gap 7.

A gas condensation chamber base 85 is positioned on the primary cover 50 at the same plane or level of the lower portion 3. An upper volume of the chamber is closed by a housing 80 shown FIG. 2. The gas condensation chamber base 85 extends parallel to the longitudinal channel 4. The gas condensation chamber base 85 receives and secures the gas condensation chamber housing 80 shown in FIG. 2.

The gas condensation chamber base 85 comprises a continuous wall or enclosure rib 8 extending around the periphery of the base 85. Three longitudinal ribs 9 extend across the gas condensation chamber base. Each rib has a least one reenforcing cross-piece 9a. Two of the ribs are interrupted at their outer ends by circular recesses 10. Six circular chambers 23 are arranged in series across the gas condensation chamber base 85 parallel with the longitudinal channel 4. The circular chambers 23 each have an outlet 33 for the exiting of escaped gas from a battery cell, to the gas condensation chamber 80, 85. Chambers 23 are positioned over respective cells of the battery (not shown). The chamber outlets 33 also allow electrolyte to flow out of the gas condensation chamber 80, 85, to the cells of a battery.

Figure 2:
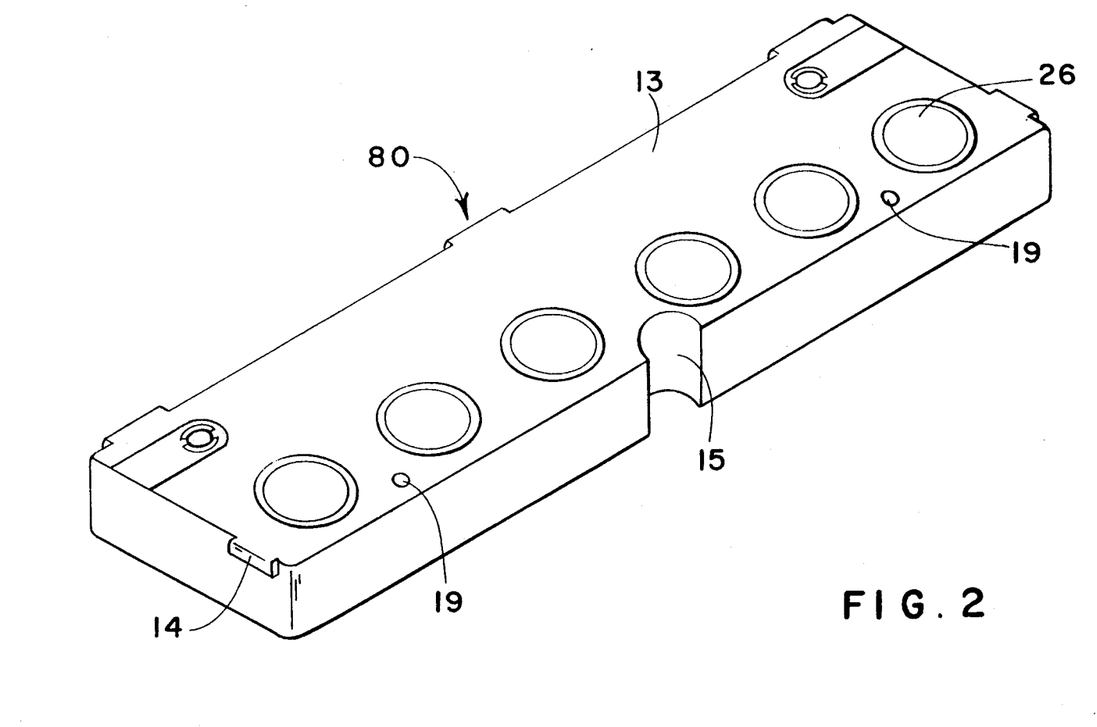
FIG. 2 is a perspective view of a housing for defining a gas condensation chamber of the present invention.

Each chamber 23 is covered by a removable plug 26 carried in housing 80 (FIG. 2).

Figure 2A:
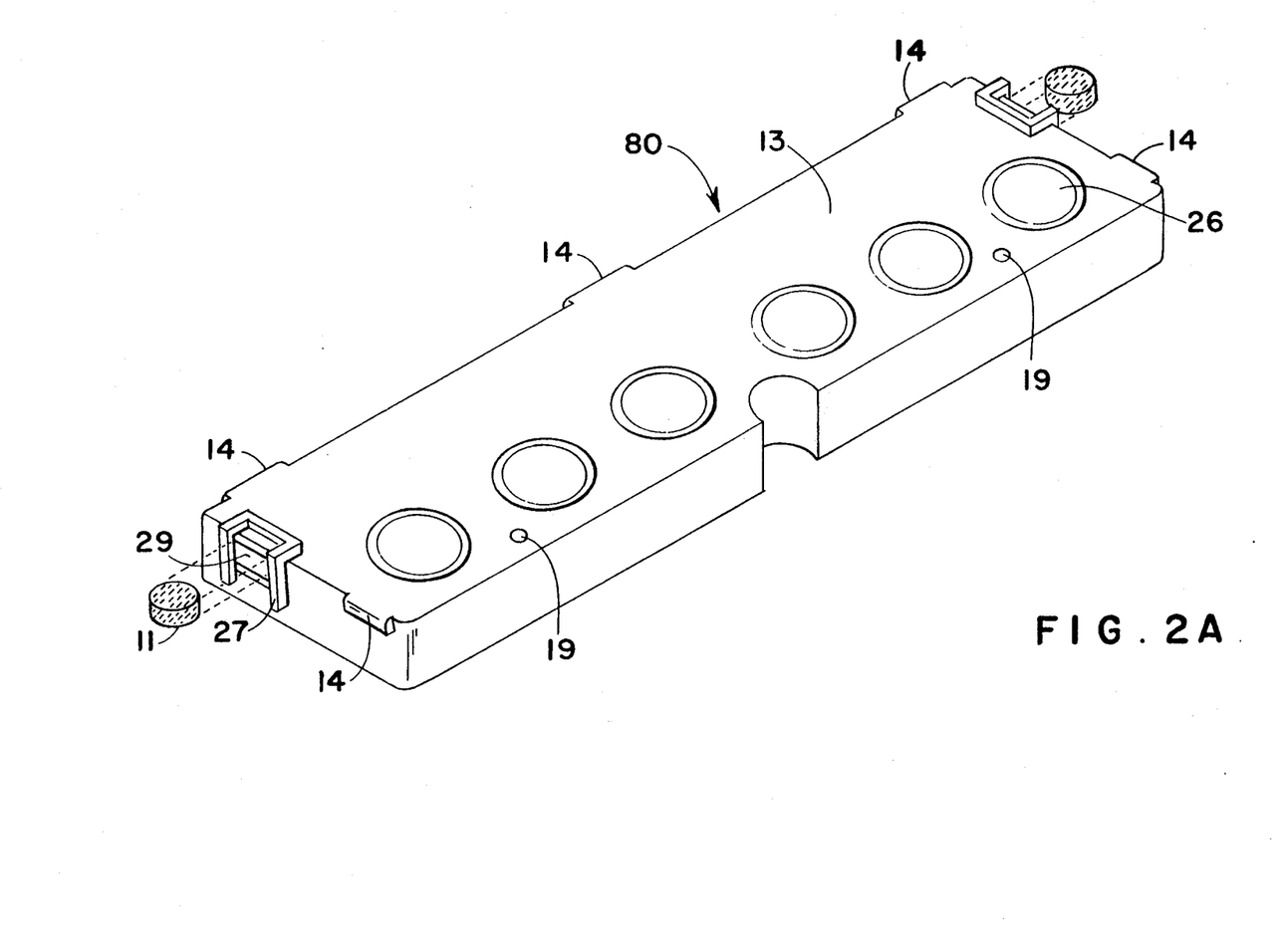
FIG. 2A is a view similar to FIG. 2 of another embodiment of the housing.

Gas entering chamber 80, 85 can escape through interruptions 10a around circular recesses 10, into the porous material of disc 11, and out through vents 29 on the side surfaces of housing 80, which receive the discs 11 as shown in FIG. 2A. Discs 11 are made of synthetic or ceramic microporous material.

The gas condensation chamber housing 80 as shown in FIG. 2 can be secured to the primary cover 50 as shown in FIG. 1 by welding the lower edge of the gas condensation cover 80 to the gas condensation chamber base 85 located on the primary cover 50 around a border 12 and over rib 8. The gas condensation chamber housing 80 has five tabs or rims 14 and two securing holes 19 for securing the secondary cover 60 of FIG. 3 to the gas condensation chamber housing 80.

The tabs or rims 14, serve to lock the secondary cover 60 shown in FIG. 3, to the housing 80, by snapping under a respective number of stops 60a, on the inner surface of secondary cover 60. Similar stops 60b in the secondary cover 60 also engage tabs or rims 2, on the outer surface of primary cover 50, in particular on the outer surface of the platform 1 of the primary cover. See FIG. 3C.

The lower edge of secondary cover 60 also engages in a recess or groove 16 defined around the top surface of primary cover 50.

If access to the electrolyte in the battery cells is required, access is provided through a lid 22 in secondary cover 60. Lid 22 is in a top surface of cover 60 and is bounded on three sides by a U-shaped weakened area 22a which can be easily cut to allow lid 22 to pivot on a crease hinge 31 as shown in FIG. 3B, for example. Secondary cover 60 is further secured to the primary cover 50, in that lid 22 includes a pair of pins 32 which engage into holes 19 in the top surface 13 of chamber housing 80. This also permits the lid 22 to be reclosed and held in a closed position after the U-shaped area 22a has been cut. Area 22a may be thin-walled parts of cover 60, or a cut-out area filled with wax that is easily cut.

Lid 22 permits access to the six plugs 26 in the chamber housing 80, to check the electrolyte level in each battery cell.

A chamber recess 15 is arranged in the gas condensation chamber housing 80 and correspond to the position of recess 7a on the opposite side of channel 4.

Because of the unique securing arrangement of the secondary cover 60 to the primary cover 50 and the gas condensation chamber housing 80, the removal of the secondary cover 60 is not possible without causing damage to either the rims 2, 14 or the secondary cover 60.

A central opening area 20 is provided on the surface of the secondary cover 60 for receiving the handle 70 shown in FIG. 4. An access lever 21 is provided near the central opening area such that when the U-shaped lever 21 is depressed with a finger, the handle 70 can be reached and raised through the central opening area 20. Access is provided since lever 21 is over recess 7a in primary cover 50.

Handle 70 shown in FIG. 4 has a central body 17 and opposite ends portions 17a, which each have cylindrical projections 18 extending from the sides. A bendable area 17b separates the end portions 17a from the body 17. Bendable portions 17b define recesses 17c which bridge over stoppers 6 in channel 4. Cylindrical projections 18 remain under flanges 5. In this way, the body 17 of handle 70 can be raised out of channel 4, where the entire handle is normally stored, allowing the bend portions 17b to bend, with outer ends of the end portions 17a staying in channel 4 to produce a handle. The end portions stop when they abut against stoppers 6. The central part of opening area 20 is wider than its end areas so that handle body 17 can rise through opening area 20.

Figure 1A:
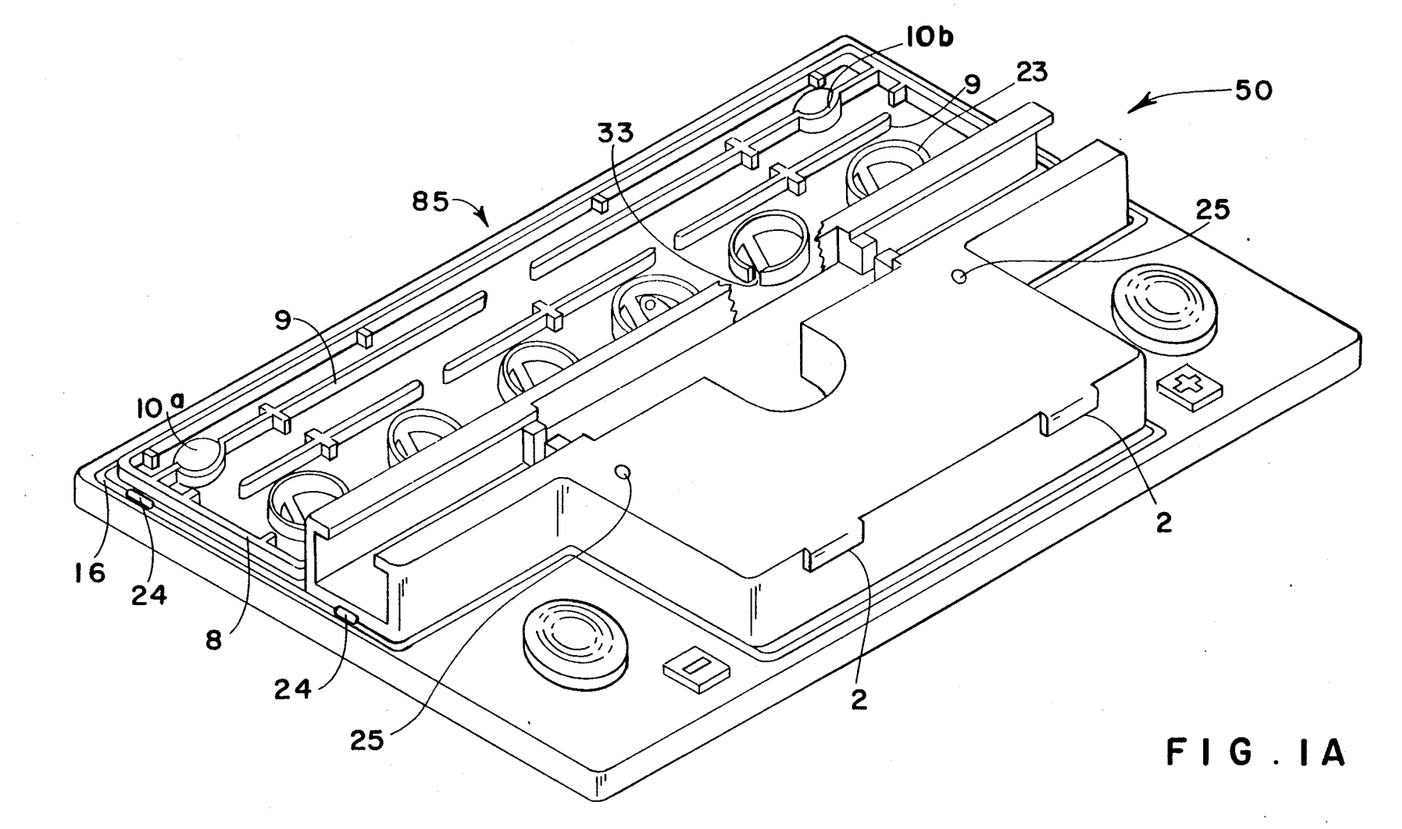
FIG. 1A is a view similar to FIG. 1 of another embodiment of the primary cover.
Figure 3A:
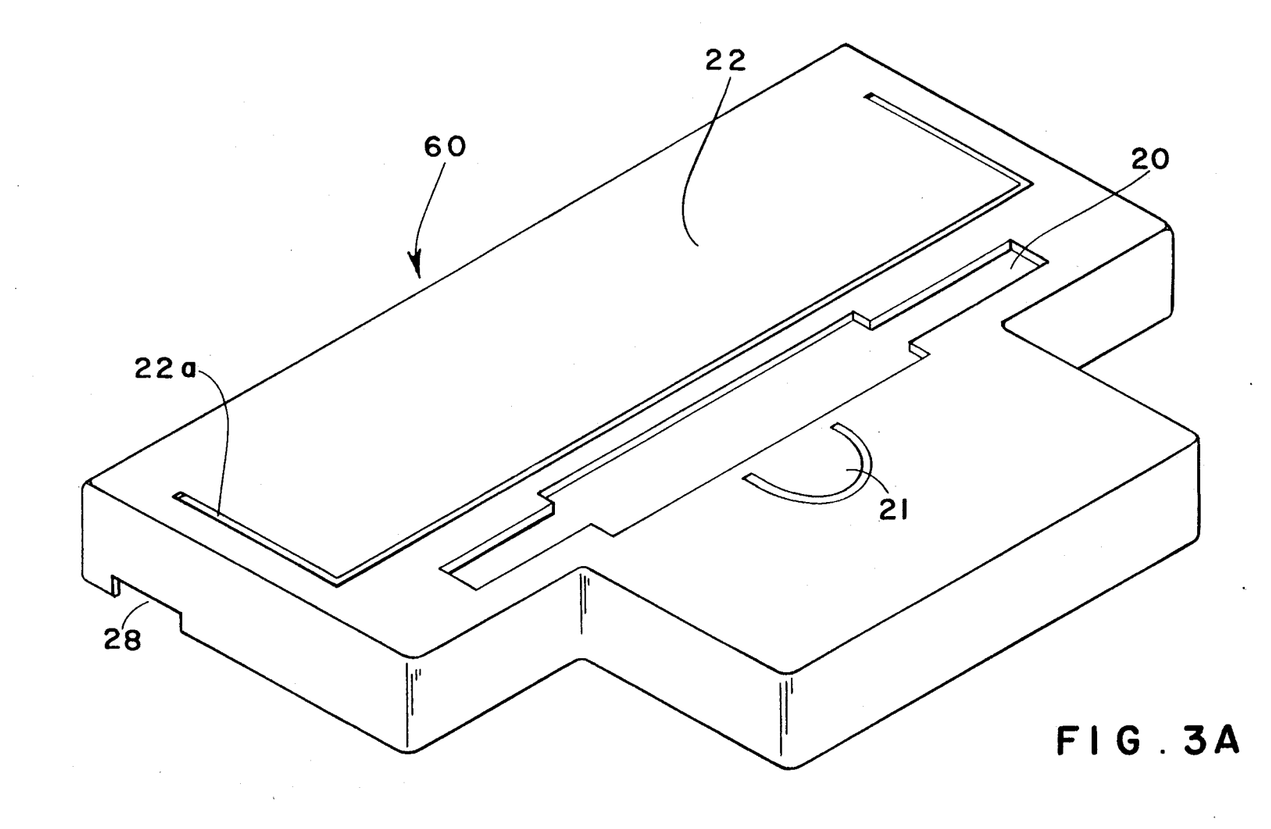
FIG. 3A is a view similar to FIG. 3, showing a second embodiment of the secondary cover.
Figures 3B, 3C, 4:
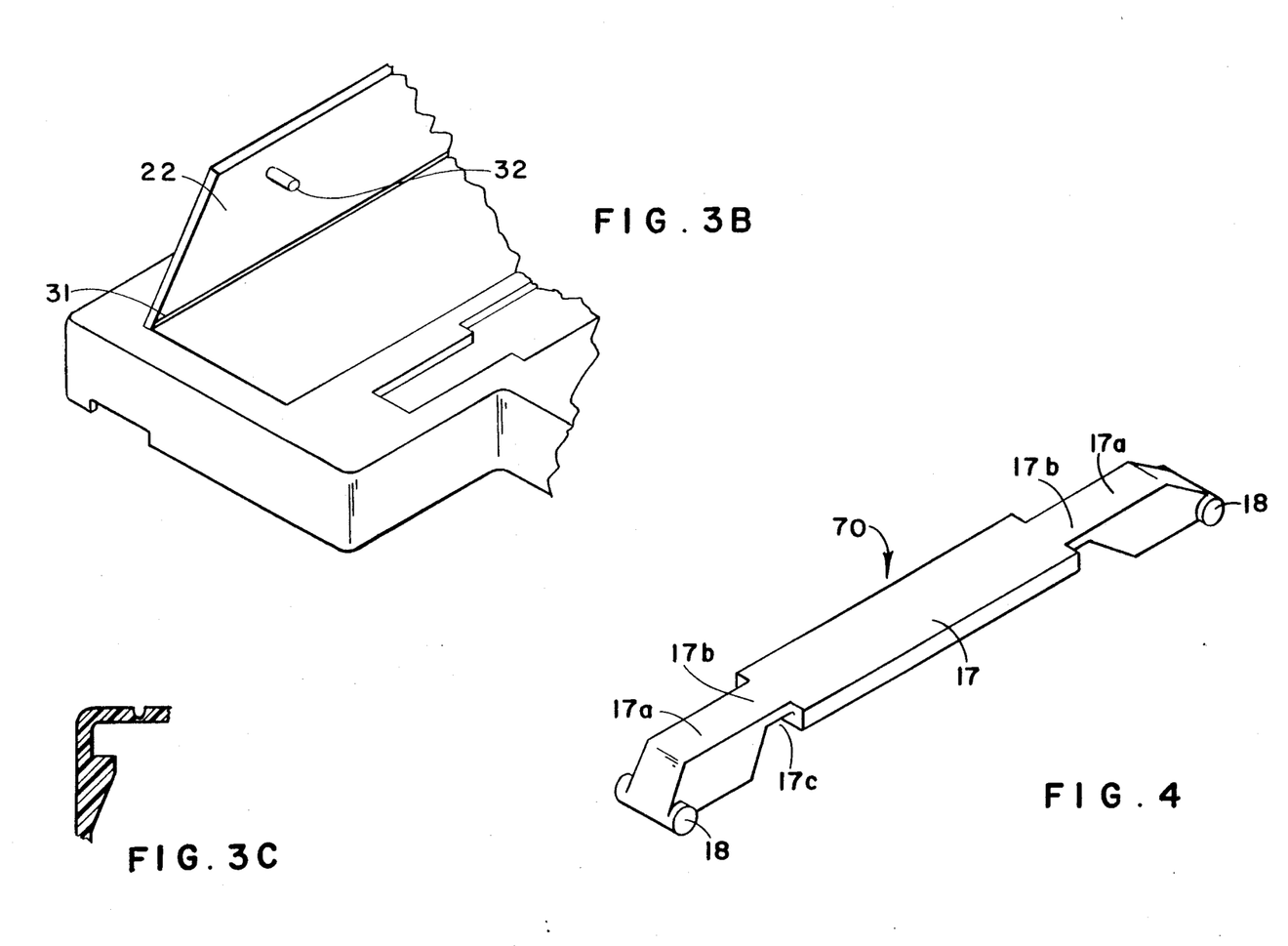
FIG. 3B is a partial perspective view of the secondary cover of FIG. 3A, after it has been opened.
FIG. 3C is a sectional view taken on line 3C—3C in FIG. 3.
FIG. 4 is a perspective view of a handle of the present invention.

FIGS. 1A, 2A and 3A illustrate a second embodiment of the invention where the same referenced numerals are utilized to describe the same or functionally similar parts.

The primary cover 50 of FIG. 1A include cross-ribs 9 extending in the continuous outer rib 8 which also encompass the circular chambers 23. Each of the circular chambers 23 has a small outlet 33 through which gas escapes in each cell into the gas condensation chamber defined between the chamber base 85 and the chamber housing 80. Four holes or interruptions 24 are also provided around the continuous groove 16 to allow for some escaping gas. Semi-circular well area 10b replace recess 10 of FIG. 1. The chamber housing 80 of FIG. 2A, also includes the tabs or rims 14, holes 19 and removable plugs 26. In addition, a U-shaped wall area 27 is provided at opposite ends of the housing which engage inner surfaces of the secondary cover 60 and define a downwardly open passage that communicates with a lower notch 28 shown in FIG. 3A. The synthetic or ceramic microporous discs 11 are inserted into side slots or vent channels 29, to filter escaping gases from the chamber housing 80. The discs 11 also help avoid flame or spark penetration into the gas condensation chamber. The gases then move downwardly in the wall area 27 and through the side notch 28 in the secondary cover 60.

While a specific embodiment of the invention has been shown and described in detail to illustrate the application of the principles of the invention, it will be understood that the invention may be embodied otherwise without departing from such principles.

I claim:

1. A cover assembly for a battery, the assembly comprising:

a primary cover (50) for fitting to a battery, the primary cover having a longitudinal channel (4) thereacross with opposite side walls (4a) and a pair of inwardly extending flanges (5) at upper edges of the side walls, extending over opposite ends of the channel (4), a pair of spaced apart stoppers (6) in said channel (4) under said flanges (5), the primary cover (50) including a T-shaped central gap (7) with semi-circular portion (7a) at a center of the longitudinal channel, a rear section of the primary cover defining a gas condensation chamber base (85);

a plurality of cross ribs (9) arranged on the primary cover on the gas condensation chamber base;

a continuous rib (8) extending around the condensation chamber base;

a continuous groove (16) extending around the continuous rib (8) and around the channel of the primary cover;

a gas condensation chamber housing (80) fixed to the primary cover around the continuous rib for defining a gas condensation chamber with the gas condensation chamber base;

a secondary cover (60) fixed to and over the primary cover and to and over the gas condensation chamber, the secondary cover having a lower edge engaged in the continuous groove (16);

a handle (70) retractably mounted in the channel (4);

a pair of opposite cylindrical projections (18) at each end of said handle, engaged in the channel (4) and under the flanges (5); and said secondary cover (60) having an opening area (20) therethrough, longitudinally aligned over the handle in the channel, for allowing the handle to rise through the opening area.

2. The cover assembly according to claim 1, wherein the secondary cover has a weakened area (22a) defining a lid (22), the weakened area being tearable from the secondary cover for opening the lid and permitting access to the housing (80) through the lid (22), the secondary cover including a U-shaped lever (21) over the semi-circular portion of the T-shaped gap for providing access to the handle.

3. A cover assembly according to claim 2, wherein the primary cover includes a raised platform (1) on one side of the channel (4), the raised platform containing the semicircular portion (7a), the gas condensation chamber housing (80) and the raised platform (1) including a plurality of tabs (2,14) for engaging and fixing the secondary cover (60) to the primary cover and to the housing.

4. A cover assembly according to claim 3, wherein the handle (70) includes a body (17), opposite end portions (17a) connected by bendable portions (17b) to opposite ends of the body (17), the cylindrical projections extending on opposite sides of the end portions, the end portions (17a) engaging the stoppers (6) on opposite sides of the body (17) with the handle raised from the channel.

5. A cover assembly according to claim 1, wherein said gas condensation chamber housing (80) includes a pair of slots (29), a microporous disk in each slot, said secondary cover (60) including a pair of notches (28) adjacent said slots of said housing, for venting gas through the discs and through the slots and notches, from the gas condensation chamber, to an exterior of the secondary cover.

* * * * *